United States Patent [19]

Paulson

[11] Patent Number: 4,623,367

[45] Date of Patent: Nov. 18, 1986

[54] SMOKE-FREE WORK AREA

[76] Inventor: Ralph E. Paulson, 14802 Grevillea St., Lawndale, Calif. 90260

[21] Appl. No.: 820,328

[22] Filed: Jan. 21, 1986

[51] Int. Cl.⁴ .............................................. B01D 50/00
[52] U.S. Cl. ................................ 55/385 R; 55/385 G; 55/467; 55/DIG. 18; 55/DIG. 29; 98/1; 98/31.5; 98/36; 98/115.3; 108/50
[58] Field of Search ............ 55/385 A, 385 R, 385 G, 55/316, 467, 473, DIG. 29, DIG. 18; 98/36, 115.3, 1, 31.5; 108/50; 131/330, 202

[56] References Cited

U.S. PATENT DOCUMENTS

| | | | |
|---|---|---|---|
| 2,507,634 | 5/1950 | Hill | 98/31.5 |
| 3,587,592 | 6/1971 | Price et al. | 108/50 |
| 3,890,126 | 6/1975 | Joseph | 55/473 |
| 3,895,570 | 7/1975 | Eagleson | 55/DIG. 18 |
| 4,248,162 | 2/1981 | Skeist | 98/115.1 |

Primary Examiner—Bernard Nozick
Attorney, Agent, or Firm—Singer & Singer

[57] ABSTRACT

A smoke-free working area is described in connection with a table having a recirculating air system. The table base comprises a sealed air chamber pressurized by a motor and filter system. Openings located on the surface of the table allow air to be dispensed at a controlled rate which travels up and is collected by a network of air ducts that support a canopy. A return path for the air is fed through a hollow support member that is connected at one end to the air ducts and at the other end to the motor and filter assembly thereby completing the flow path. Smoke and other pollutants are carried into the system and filtered in a continuous fashion, thereby providing a continuous smoke-free environment for other persons located adjacent the smoke-free table area.

14 Claims, 11 Drawing Figures

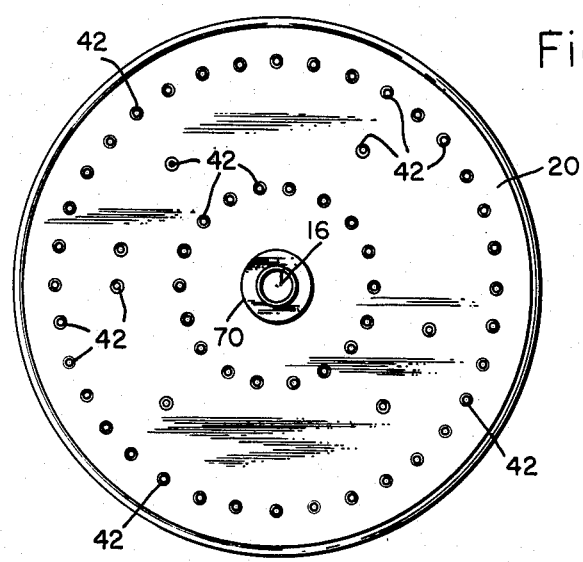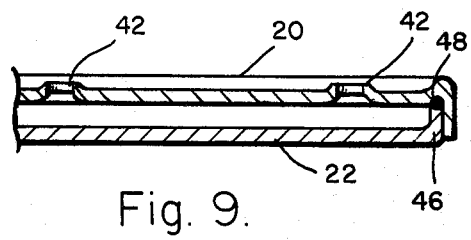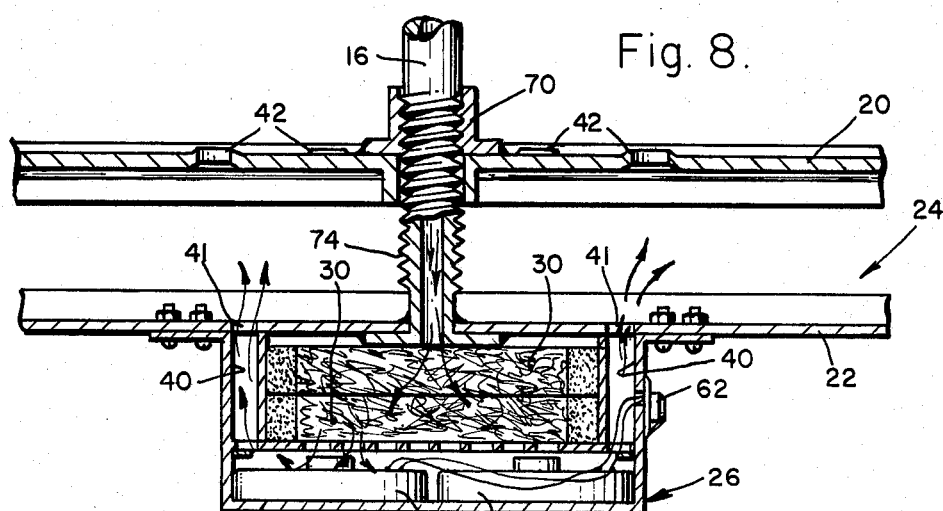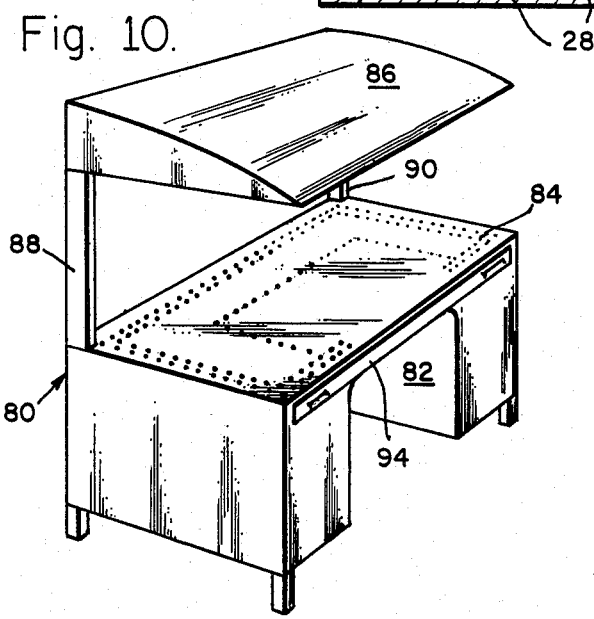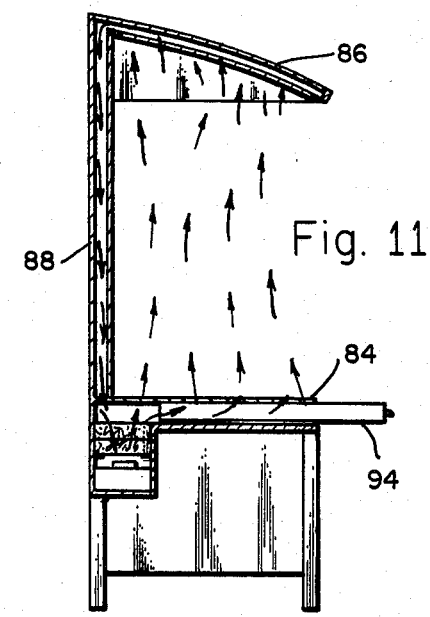

SMOKE-FREE WORK AREA

This invention relates to a table system for use by smokers and more particularly to a table system capable of being located in areas frequented by non-smokers and in which smoke generated by the smokers is recirculated and filtered at the table area without affecting adjacent tables frequented by non-smokers.

In our present society there are many people who smoke cigarettes and cigars which in the normal course of events give off smoke that non-smokers find offensive and irritating to their non-smoking lifestyle. This position has been substantiated by the Surgeon General of the United States government who has determined that smoking can be dangerous to the health of the smoker. In this regard, federal law now requires that the following warning be placed on all packages of cigarettes: "WARNING: The Surgeon General has determined that cigarette smoking is dangerous to your health."

Following this decision by the Surgeon General, many municipalities have passed laws requiring establishments to offer the non-smoking general public a choice of areas where they work, play and even eat, which areas are free from smoke caused by smokers and also areas that are free from the by-products generated by the smoking public.

In connection with these legal requirements, eating establishments and working establishments are hard put to offer separate areas and rooms and partitions that separate the smoking public from the non-smoking public. The cost to the business community in offering separate work areas and separate eating areas has been tremendous and even today there are laws on the books requiring separate and equal areas that are horribly expensive to the mercantile establishments and to the local restauranteurs.

The smoking public maintains that they are entitled to smoke where they work, where they do business, and where they enjoy their libations, whereas the non-smoking public insist and demand that they are entitled to air that is free from the offensive smoke and free from the by-products of smoke, claiming that not only is smoking dangerous, but that the by-products of the smoke caused and exhaled by smokers is also dangerous and hence just having separate areas to work, eat and play is not at all satisfactory to the non-smoking public.

The present invention represents a very serious attempt to allow the working and eating public to be in close proximity to each other and to still separate the offensive smoke-filled areas caused by the smoker from intruding into the non-smoking areas enjoyed by the non-smoker worker and the non-smoker eater.

In the broadest sense this invention discloses a work table that could be fashioned either as a table for dining or as a work area that is self-contained in processing and filtering smoke caused by the diner or the worker and in such a way processes the smoke and filters the smoke and also prevents the smoke from leaving the area to invade the province of the non-smoker.

In this invention there is disclosed a table comprising upper and lower spaced-apart horizontal surfaces for defining a sealed air chamber between said surfaces. A motor and filter system is located below the lower horizontal surface and is used to pressurize the air chamber located between the surfaces.

The upper horizontal surface representing the table surface contains a plurality of openings arranged and adapted to release the pressurized air from the air chamber and at a controlled rate.

Located above the table is a cover which may be a solid cover or a soft fabric cover adapted and arranged to fully encompass the table area so as to collect all smoke generated by persons sitting at the table as a result of the air flow emanating from the openings on the upper surface of the table.

A hollow member used as an air return chamber supports the cover and communicates at one end to the motor and filter system for creating a vacuum within the hollow member. A network of air ducts cooperates with the cover and communicates with the hollow supporting member in order to form a fluid path for the air that is continuously recycled from the upper table through the air ducts back through the hollow member to the motor and filter assembly and back to the sealed air chamber between the upper and lower surfaces of the table. As long as the motor and filter assembly are operating, the pressurized chamber will cause air to move from the openings in the upper surface up to the cover where the air is collected by the network of air ducts and back down through the hollow member to complete the recycle of all air within the confines of the outside cover.

The cover itself may be a solid cover having the network of air ducts as an integral part of the cover or in the alternative the top cover may be a soft fabric with the network of air ducts consisting of a plurality of separate ducts, each communicating with the hollow supporting member and at the same time providing the support for the canvas cover.

The described table provides a smoke-free work area which may be used by diners at restaurants or may be located at work stations among and between table used by non-smokers.

In this fashion the smoker may be integrated with the non-smoker and at the same time the rights of the non-smoker are preserved and at minimum cost to the restauranteur or the employer who must supply areas free of smoke for the non-smoker.

Further objects and advantages of the present invention will be made more apparent by referring now to the accompanying drawings wherein:

FIG. 3 is a plan view of the upper table surface of FIG. 1;

FIG. 8 illustrates how the upper surface of a table is maintained in a spaced-apart relationship from the lower surface for the second embodiment illustrated in FIG. 7;

FIG. 9 illustrates a partial view of the end portion of the upper surface and the lower surface in a sealed relationship with the second embodiment illustrated in FIG. 7;

FIG. 10 is a perspective view of a work area constructed according to the principles of this invention; and FIG. 11 is a cross-sectional view of FIG. 10.

Figure 1:
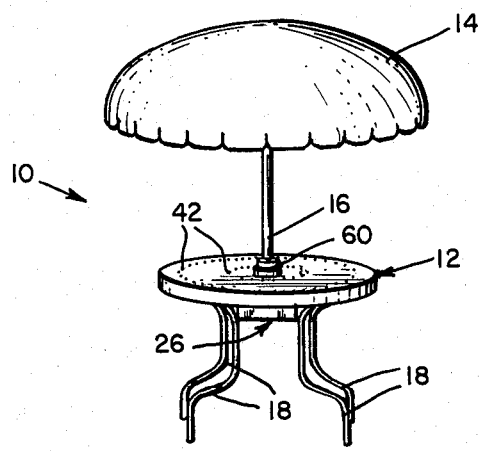
FIG. 1 illustrates a perspective view of a smoke-free restaurant table constructed according to the principles of this invention.

Referring now to FIG. 1, there is shown a perspective view of a table 10 that might be located in a restaurant and which is particularly adapted for use by smokers.

The table comprises a suitable eating surface 12, a cover 14 supported by a mast 16 and in which the cover completely encompasses the eating area of the surface 12. The table is supported by a plurality of legs 18 and to all outside appearances the table is normal, functional and could fit in with any decor, depending on exterior designs, table shape, leg sizes, and ornamentations on the cover 14.

The outside appearances of table 10 belie its real function which is to collect smoke of the diners and recycle the smoke in such a fashion that the smoke is filtered and also prevented from leaving the immediate area to influence non-smokers in adjacent areas.

Figure 2:
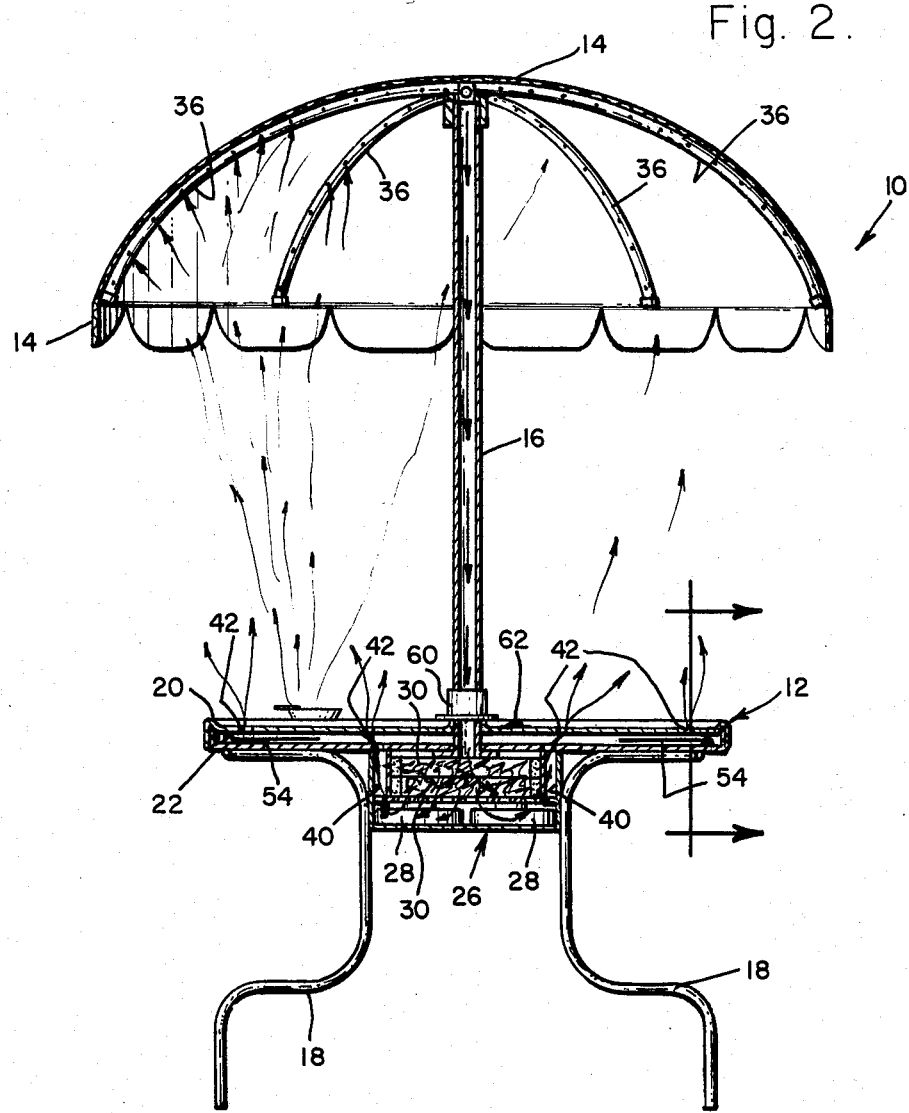
FIG. 2 is a cross-sectional view of FIG. 1.

Referring now to FIG. 2, there is shown a cross-section of table 10 illustrated in FIG. 1.

A careful review of FIG. 2 will show that the eating surfaces 12 actually comprise an upper horizontal surface 20 in contact with a lower horizontal surface 22 so as to define a sealed air chamber 24 there between.

The legs 18 are attached to the bottommost surface of the lower horizontal surfaces 22 and provide the basic support of the table structure.

In the preferred embodiment the table structure is circular, however, the actual shape of the table is immaterial to the practice of the invention and the circular embodiment illustrated is a pleasing design which more fully illustrates the inventive concept.

Centrally located on the bottommost portion of the table and between the legs 18 is a motor and filter assembly 26 which comprises a pair of motors 28 and a pair of filters 30.

The support member 16 is actually hollow and communicates with the suction port 32 of the motor and filter assembly 26. The upper portion of the support member 16 is connected to a network of air ducts 36 each being hollow and having a plurality of openings that communicate with the hollow support member 16. The network of air ducts 36 also provide the basis for supporting the flexible cover 14 thereby ensuring that the complete work area or dining area encompassed by the eating surface 12 is covered.

The pressurized section of the motor and filter assembly 26 is fed through passageways 40 to the sealed air chamber 24 located between the upper surface 20 and the lower surface 22 through openings 41 located on bottom surface 22. The upper surface 20 contains a plurality of openings 42 for releasing air from the sealed air chamber 24 and at a controlled rate.

Referring now to FIG. 3, there is shown a plan view of the upper surface 20 illustrating the openings 42 located on a plurality of radii from the center of the upper surface and radiating out from support member 16.

The actual shape of the openings 42 may be circular or they may be slits and may be placed in an arbitrary position on the upper surface 20 determined only by external considerations such as size of table, volume of air to be released, and whether the surface will be used for eating or working and whether liquids will be offered that may or may not spill on the surface. It is envisioned that slit openings may be more preferable in certain areas while random circular openings located further away from the immediate work area or eating area may be more desirable.

In considering the operation of the invention, the motor and filter assembly pressurizes the chamber 24 causing air to be released from openings 42 and at a controlled rate. The air within the confines of the cover 14 collect the rising air and the smoke caused by the users of the table, which smoke is collected within the network of air ducts 36 and returned to the hollow support member 16 to the vacuum end of the motor and filter assembly where the air flow is continued and repeated.

Considering that the table has great applicability for use in restaurants, provision has been made for separating the upper surface 20 from the lower surface 22 for cleaning purposes. In this connection it must be remembered that the table will be located at a restaurant and, hence, ease of separating the surfaces is paramount and provision is provided for maintaining the upper surface in a spaced-apart relationship from the lower surface while the cleaning operation takes place. It is envisioned of course that spillage will take place and that fluids, crumbs and other debris will enter the sealed air chamber through the openings 42.

In the preferred embodiment the upper surface 20 simply rests upon the lower surface 22 to define the sealed relationship. The waitress or busboy has only to raise the upper surface 20 and hold the upper surface 20 in a spaced-apart relationship with respect to the lower surface 22 while the cleaning operation takes place.

Figure 4:
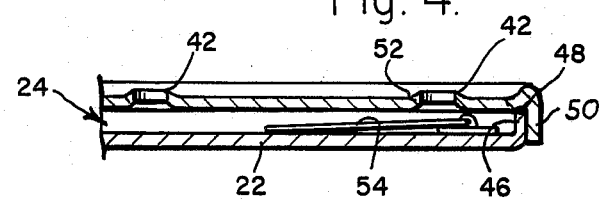
FIG. 4 is a section taken along lines 4—4 of FIG. 2.

Referring now to FIG. 4, there is a section taken along lines 4—4 of FIG. 2 which illustrate the upper surface 20 in a sealed relationship with the lower surface 22 to thereby define the sealed air chamber.

Located on the periphery of the lower horizontal surface 22 is a shoulder 46 having a circular sealing member 48 located atop the shoulder.

The upper surface 20 also contains a reverse shoulder 50 located on the periphery thereof and adapted to cover and mate with the sealing member 48 located atop the shoulder 46 attached to the lower horizonal surface 22. In this manner a sealed air chamber is achieved between the upper surface 20 and the lower surface 22 with the surfaces in the normal position.

The upper surface 20 also contains a plurality of openings 42 illustrated as circular openings and located on raised surfaces or dimples 52. The dimples 52 provide a raised surface on the upper surface of the table 20 and thereby prevent spilled fluid falling on the upper surface to pass through the openings 42. As mentioned previously, the openings 42 may be slits or any other preferred shape consistent with the use of the table, that is, whether it is used as an eating surface or whether it is used as a work surface. The function of the holes in dispensing a controlled rate of air from the air chamber 24 is always the same regardless of the use made of the table.

Recognizing that the openings 42 located on the upper surface 20 will in all probability accept debris whether it be crumbs, liquids, eraser shavings or the like, it is necessary to provide a means for separating the upper surface from the lower surface in order to allow personnel to clean the air chamber 24. The upper surface 20 is adapted to be raised a vertical distance as will be disclosed in connection with FIG. 6 and in the raised position a locking bar 54 is attached to the lower surface 22 and stowed in a horizontal position with the upper surface 20 and the lower surface 22 in a sealing relationship.

Figure 5:
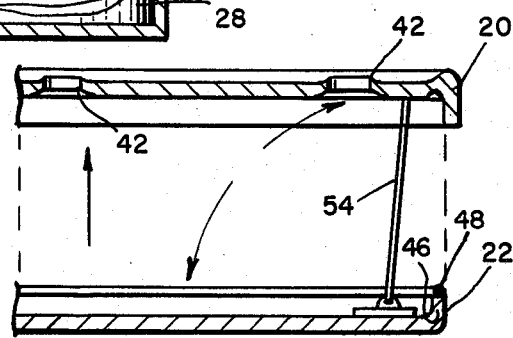
FIG. 5 illustrates a preferred means for holding the upper surface in a spaced-apart position from the lower surface.

Referring now to FIG. 5, there is shown an illustration of the upper surface 20 in a raised position above the lower surface 22 for cleaning purposes. In this position the support bar 54 is rotated in a vertical position and provides a support maintaining the separate distance between the upper surface and the lower surface, thereby allowing personnel to clean the space between the surfaces of any debris that may have entered the sealed air chamber through opening 42.

Figure 6:
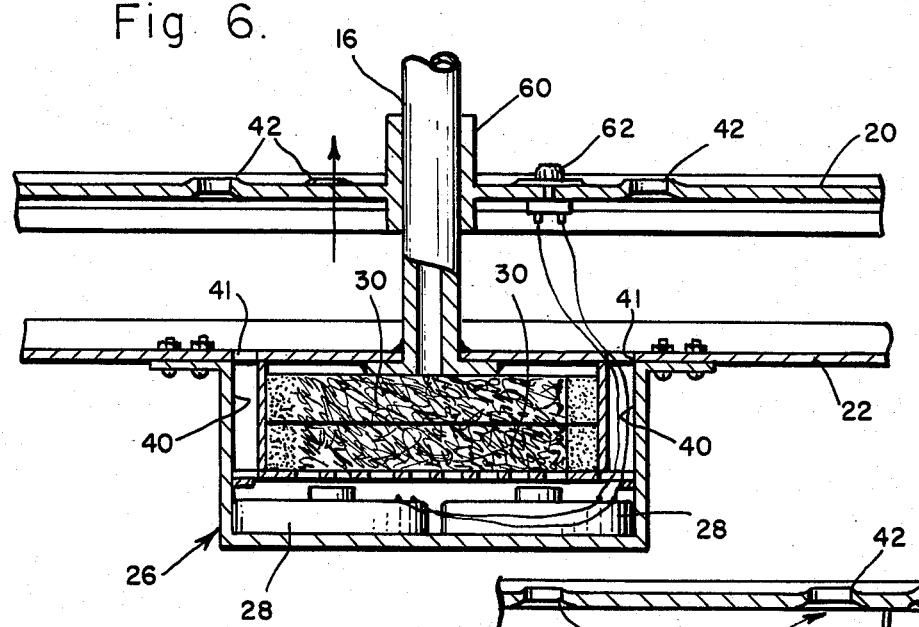
FIG. 6 illustrates the upper surface in the spaced-apart position from the lower surface for cleaning purposes.

Referring now to FIG. 6, there is shown a more detailed view of the relationship between the upper surface 20 and the lower surface 22 in a spaced-apart relationship.

In the embodiment illustrated in FIG. 6, the upper surface 20 is attached to a cylindrical collar 60 that is adapted to slide in a vertical direction on the external surface of the hollow support member 16. A timing control 62 is fixedly attached to the upper surface 20 and is electrically connected to the disc motors 28. For cleaning purposes the operator need only lift the upper surface 20 in a vertical direction and place the support bar 54 in a vertical position as shown in FIG. 5 to thereby support the upper surface 20 in a spaced-apart relationship with respect to the lower surface 22. In this condition the sealed air chamber may be cleaned of debris if needed.

The embodiment illustrated in connection with FIGS. 2, 4, 5 and 6 allow the upper surface 20 to be moved vertically for cleaning purposes. The disadvantage is that the upper surface must be maintained in this vertical spaced-apart relationship and hence the need of the support bar 54 shown in FIG. 5 is needed.

Figure 7:
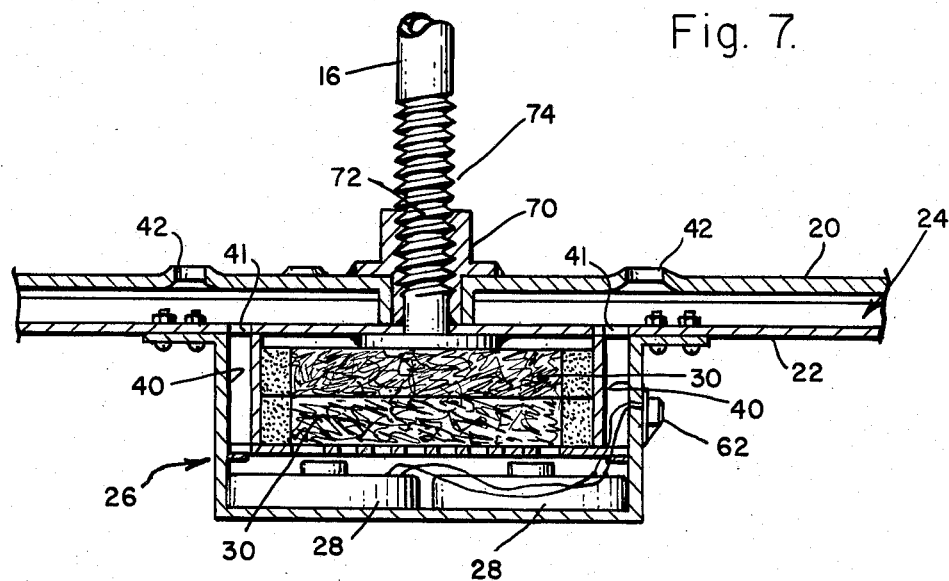
FIG. 7 illustrates a second embodiment for maintaining a sealed air chamber between the upper surface and the lower surface comprising the table.

Referring now to FIGS. 7, 8 and 9, there is illustrated a second embodiment in which the upper surface 20 does not move vertically on a cylindrical collar but, rather, is rotated on a threaded collar which has the effect of allowing the upper surface to be screwed into a vertical position without the need of a support bar 54 which is illustrated in FIGS. 4 and 5.

Referring now specifically to FIG. 7, there is shown a second embodiment of the table illustrating the upper surface 20 in a sealing relationship with the lower surface 22 and in which the motor and filter assembly 26 is attached to the lowermost surface as previously described.

The upper surface 20 is attached to a threaded collar 70 having internal threads 72 that mate with external threads 74 located on the bottommost portion of the hollow mast 16.

The function of the table illustrated in FIG. 7 is exactly the same as that described and illustrated in connection with FIG. 2, however, in the event that cleaning of the air chamber 24 is required, then it is only necessary that the upper surface 20 be rotated in a clockwise direction, thereby allowing the threads 72 on collar 70 to ride up thread 74 attached to the support member 16. The operator need only rotate the upper surface 20 a distance sufficient to allow entry to the sealed chamber 24 for cleaning purposes and in this way eliminates the support bar 54 illustrated in connection with FIGS. 4 and 5.

Referring now to FIG. 8, there is shown the second embodiment with the upper surface 20 raised to an upper position thereby allowing access to the air chamber 24. The collar 70 having threads 72 has moved in a vertical direction up the support member 16 on threads 74 which now maintains the upper surface 20 in a spaced-apart position with respect to the lower surface 22.

Because of the rotational aspects of the upper surface 20, it is necessary to replace the timer control 62 from a position on the upper surface 20 as illustrated in connection with FIG. 6 to a new position located directly on the casing supporting the motor and filter assembly 26. The functions and operation of the motors and the filters are exactly the same as that described and illustrated in connection with FIG. 2.

Referring now to FIG. 9, there is shown the upper surface 20 in a sealing relationship with the lower surface 22 for the second embodiment. The absence of any support bars 54 will also be noted.

Referring now to FIGS. 10 and 11, there is shown additional embodiments illustrating the constuction of a smoke-free work area more adapted to commercial use rather than restaurant use.

In FIG. 10 there is illustrated a work table 80 having a knee-hole desk 82 and a work area 84 approximating that of a conventional size desk.

A cover 86 is adapted to completely cover the work area 84 and is supported by a plurality of hollow support members 88 and 90.

A drawer 94 located below the work surface 84 contains a plurality of holes on the back portion not illustrated, thereby allowing air from the motor portion to pass through the closed drawer 94 and out the holes located on the work surface 84. The drawer 94 is adapted to be opened and allows access under the work surface 84 for cleaning purposes.

FIG. 11 is a cross-sectional view of FIG. 10 and illustrates the preferred air flow over the work area that eliminates smoke generated by the user at the work station of FIG. 11 from affecting adjacent or other persons in the immediate vicinity. The cross-sectional view illustrated in FIG. 11 also illustrates how the network of air ducts is combined in the cover 86 thereby making the cover and the air ducts an integral unit. For some installations this is more desirable, whereas in other installations a separate non-functional cover as illustrated in FIG. 1 is used over the network of air ducts.

I claim:
1. A smoke-free work area comprising:
  a table having an upper and lower spaced-apart horizontal surface defining a sealed inner air chamber,
  a motor and filter system having a pressure end and a vacuum end and located below said table and in which said pressure end communicates with said air chamber for pressurizing said air chamber,
  said upper horizontal surface having a plurality of openings for releasing air from said air chamber at a controlled rate,
  a cover located above said table and adapted to substantially encompass the complete table for collecting and trapping air emanating from said upper horizontal surface,
  a hollow member having a first end and a second end and adapted to support said cover and in which said first end communicates with said vacuum end of said motor and filter system for creating a vacuum within said hollow member, and
  a network of air ducts cooperating with said cover and communicating with said second end of said hollow member whereby a fluid path of air is pro- vided from said air chamber through said openings on the upper horizontal surface through the network of air ducts and through the hollow member to the motor and filter system and back to the air chamber.

2. A table according to claim 1 in which said lower horizontal surface contacts said upper horizontal surface along the periphery in a sealing relationship.

3. A table according to claim 1 which includes a variable timer connected to said motor and filter system for controlling the duration said motor is energized at any given time.

4. A table according to claim 1 in which said filters are removable and replaceable.

5. A table according to claim 1 in which said openings on said upper surface are circular and are located generally along the periphery of the upper surface.

6. A table according to claim 1 in which said openings are located in raised dimples on said upper surface whereby spilled fluid is caused to run around the dimples and away from the openings.

7. A table according to claim 1 in which said network of air ducts are located within said cover.

8. A table according to claim 1 in which said cover is soft and pliable and said network of air ducts supports said cover.

9. A table according to claim 1 in which said cover includes a network of air ducts as a integral part.

10. A table according to claim 1 in which said upper and lower horizontal surfaces are substantially rectangular and include at least two hollow members located at the corners of said horizontal surfaces for supporting said cover.

11. A table according to claim 1 in which said upper horizontal surface is movable with respect to said lower horizontal surface.

12. A table according to claim 3 in which said upper horizontal surface is movably supported a selected distance from said lower horizontal surface.

13. A table according to claim 1 in which said upper and lower horizontal surfaces are circular and in which said openings on said upper surface are located on a plurality of radii from the center of said upper surface.

14. A table according to claim 13 in which said hollow member is located at the centermost portion of said circular horizonal surfaces.

* * * * *